United States Patent [19]

Aoyama et al.

[11] Patent Number: 4,628,880
[45] Date of Patent: Dec. 16, 1986

[54] INDUCTION SYSTEM FOR INTERNAL COMBUSTION ENGINE HAVING MULTIPLE INLET VALVES PER COMBUSTION CHAMBER

[75] Inventors: Shunichi Aoyama, Yokosuka; Hiroshi Fujii; Manabu Kato, both of Tokyo, all of Japan

[73] Assignee: Nissan Motor Co., Ltd., Japan

[21] Appl. No.: 714,976

[22] Filed: Mar. 22, 1985

[30] Foreign Application Priority Data

Mar. 30, 1984 [JP] Japan .................................. 59-60918

[51] Int. Cl.$^4$ ............................................. F02B 15/00
[52] U.S. Cl. .................. 123/432; 123/188 M; 123/52 M
[58] Field of Search ............... 123/308, 188 M, 432, 123/52 M, 585

[56] References Cited

U.S. PATENT DOCUMENTS

| | | | |
|---|---|---|---|
| 3,211,137 | 10/1965 | Love | 123/188 M |
| 4,438,743 | 3/1984 | Namba et al. | 123/308 |
| 4,492,211 | 1/1985 | Shimomura et al. | 123/585 |
| 4,494,504 | 1/1985 | Yagi et al. | 123/432 |

FOREIGN PATENT DOCUMENTS 2087975 6/1982 United Kingdom ............... 123/432

*Primary Examiner*—E. Rollins Cross
*Attorney, Agent, or Firm*—Lane and Aitken

[57] ABSTRACT

In order to prevent large amounts of residual gas from remaining in the combustion chamber after the exhaust phase in an engine provided with dual induction arrangement including two inlet valves and corresponding induction ports, air is bled into the port which closed off by a flow control valve during low speed operation so as to obviate the vacuum which tends to develop therein and induct exhaust gas during the exhaust phase.

8 Claims, 9 Drawing Figures

INDUCTION SYSTEM FOR INTERNAL COMBUSTION ENGINE HAVING MULTIPLE INLET VALVES PER COMBUSTION CHAMBER

BACKGROUND OF THE INVENTION

1. Field of the Invention

The present invention relates generally to an induction system for an internal combustion engine having multiple inlet valves for each combustion chamber there of and more specifically to such an induction system which reduces the amount of residual gas retained in the combustion chamber and induction conduiting immediate upstream of the combustion chamber, when the engine is operating under low speed/load conditions such as idling, and thus improves the combustion process under such conditions.

2. Description of the Prior Art

FIGS. 1 to 3 show an induction system proposed in Japanese Patent Application First Publication No. 47-31724. In this arrangement the induction system includes a so called "low speed" induction passage 1 and a "high speed" induction passage 2 which branches off from the former. Poppet valves 3, 4 control communication between the combustion chamber 5 and the respective induction conduits 1, 2. A butterfly type flow control valve 6 is disposed in the high speed induction passage 2 and downstream of the engine throttle valve 7. This valve is arranged to prevent the flow of air through the "high speed" passage 2 during the aformentioned low speed/load mode of engine operation.

Poppet valve 4 is arranged to be controlled in a timed relationship with the exhaust valve 8 so as to provide a large valve overlap (see solid line trace in FIG. 2). This of course improves engine respiration during high speed. On the other hand, poppet valve 3 is arranged to be opened and close with a relatively small overlap which is suited to low-intermediate speed/load operation such as idling (See chain line trace in FIG. 2).

However, with this type of arrangement a considerable volume tends to be defined in the high speed passage 2 between the flow control valve 6 and the poppet valve 4 (for example 15-20% of the cylinder clearance with the piston at TDC) when the engine is idling and/or operating under low speed load condition. Further, a relatively high vacuum (e.g. 400 mmHg) develops in this section of the "high speed" induction conduit under such conditions. Accordingly, as the butterfly valve 6 is closed at this time so as to effectively render the high speed inlet valve inoperative, when the latter in fact lifts during idling, the exhaust gases contained in the combustion chamber at the beginning of the exhaust phase are sucked into and mix with the air or air-fuel mixture trapped in the section of high speed induction conduit between the valves. This undesirably causes an increase in the amount of exhaust gas (viz., residual gas) which fails to be discharged during the exhaust phase and markedly degrades the combustion process under such conditions.

SUMMARY OF THE INVENTION

It is an object of the present invention to provide a multiple inlet valve induction system which includes a control arrangement which obviates the above mentioned increase in residual gas during idling.

In brief, this object is achieved by an arrangement wherein, in order to prevent large amounts of residual gas from remaining in the combustion chamber after the exhaust phase, air is bled into the "high speed" port which is closed off during idling and the like low speed/load engine operation, so as to obviate the vacuum which tends to develop therein.

In more specific terms, a first aspect of the present invention is deemed to come in the form of an an internal combustion engine which includes: a combustion chamber; first and second inlet valves, the first inlet valve being arranged to open at a first predetermined timing prior the end of the exhaust phase of the engine, the second inlet valve being arranged to open essentially at the end of the exhaust phase; a first induction conduit leading from a source of air to the first inlet valve; a second induction conduit leading from the source of air to the second inlet valve; an engine throttle valve operatively interposed between the source of air and the first and second induction conduits; a flow control valve disposed in the first induction conduit for cutting off communication between the source of air and the first inlet valve when the engine is operating in a first mode and for permitting the communication when the engine is operating under a second mode; and an air bleed formed in the first induction conduit at a location downstream of the flow control valve for permitting a controlled amount of air to enter thereinto.

A second aspect of the present invention is deemed to come in a method of operating an internal combustion engine which comprises the steps of: (a) introducing air for a source of air into a combustion chamber through both of first and second induction ports during a first mode of engine operation; (b) opening a first valve which controls fluid communication between the source and the combustion chamber via the first induction port at a predetermined timing prior the end of the exhaust phase of the engine; (c) opening a second valve which controls fluid communication between the source and the combustion via the second induction port at essentially the end of the exhaust phase; (d) cutting off communication between the source of air and the first inlet valve during a second mode of engine operation using a flow control valve associated with the first induction port; and (e) reducing the amount of exhaust gas which tends to remain in the combustion chamber during the second mode by obiviating the formation of a negative pressure in the first induction port immediately upstream of the first inlet valve via introducing a limited amount of air into the first induction port downstream of the flow control valve.

A further aspect of the present invention is deemed to come in (f) injecting fuel into the second induction port immediately prior the opening of the second inlet valve when the engine is operating in the second mode; (g) allowing some of the air introduced in step (e) to back flow into the second induction port immediately after the lift of the second valve; (h) mixing the fuel injected in step (f) with the air permitted to backflow into the second induction port; and (i) reinducting the air-fuel mixture which results in step (h) into the combustion chamber for combustion therein.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
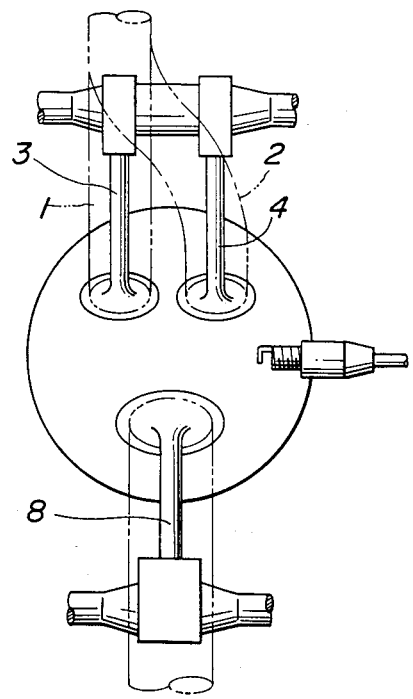
FIG. 1 is a schematic plan view of the prior art arrangement discussed in the opening paragraphs of the instant disclosure.
Figure 2:
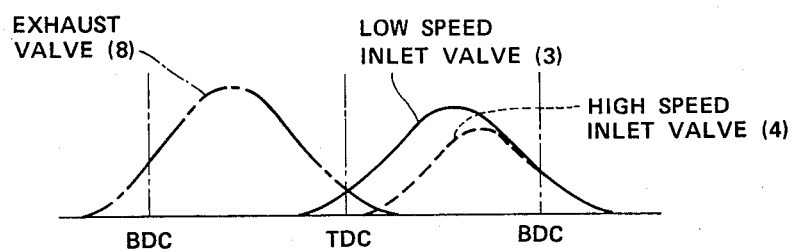
FIG. 2 is a graph showing the valve lift characteristics of the arrangement shown in FIG. 2.
Figure 3:
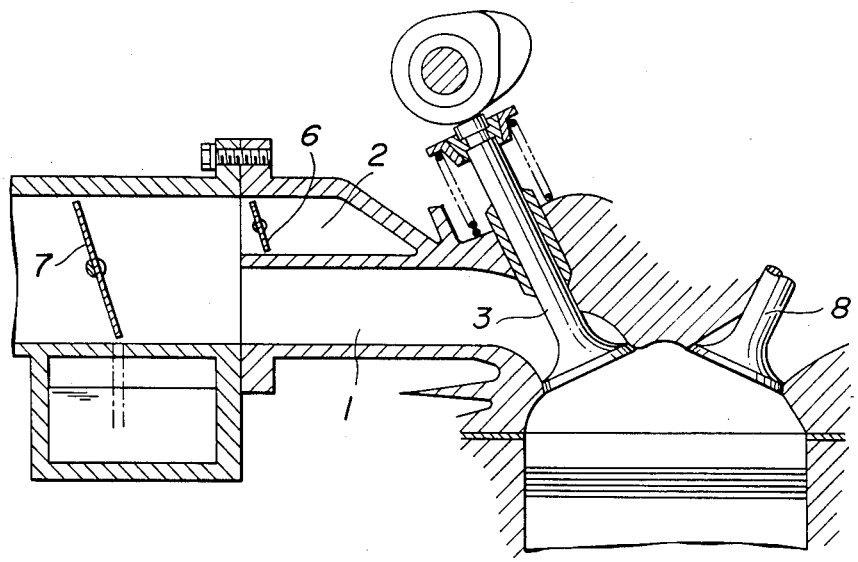
FIG. 3 is a sectional elevation of the prior art arrangement shown in FIG. 1.
Figure 4:
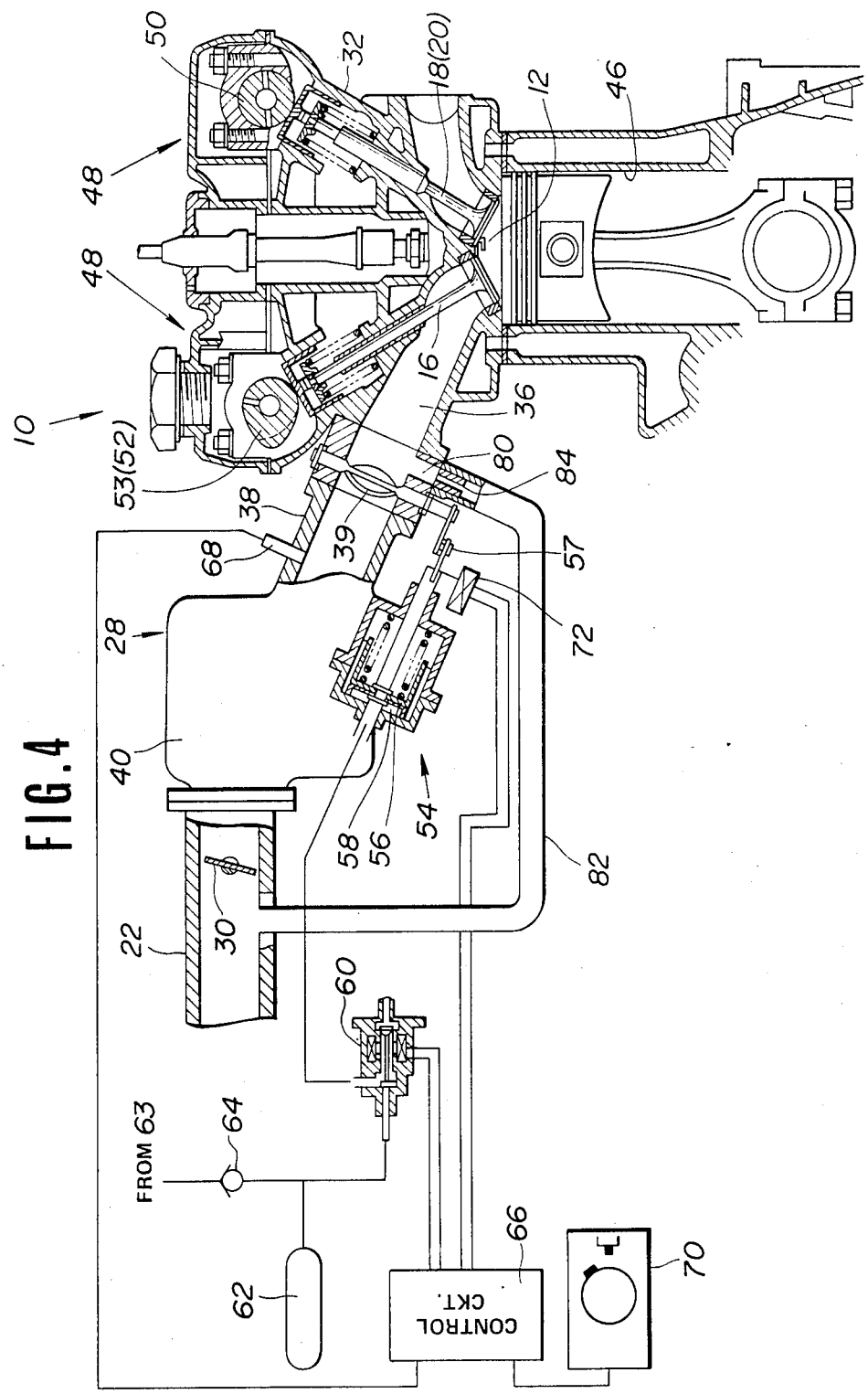
FIG. 4 is a sectional elevation of an embodiment of the present invention.
Figure 5:
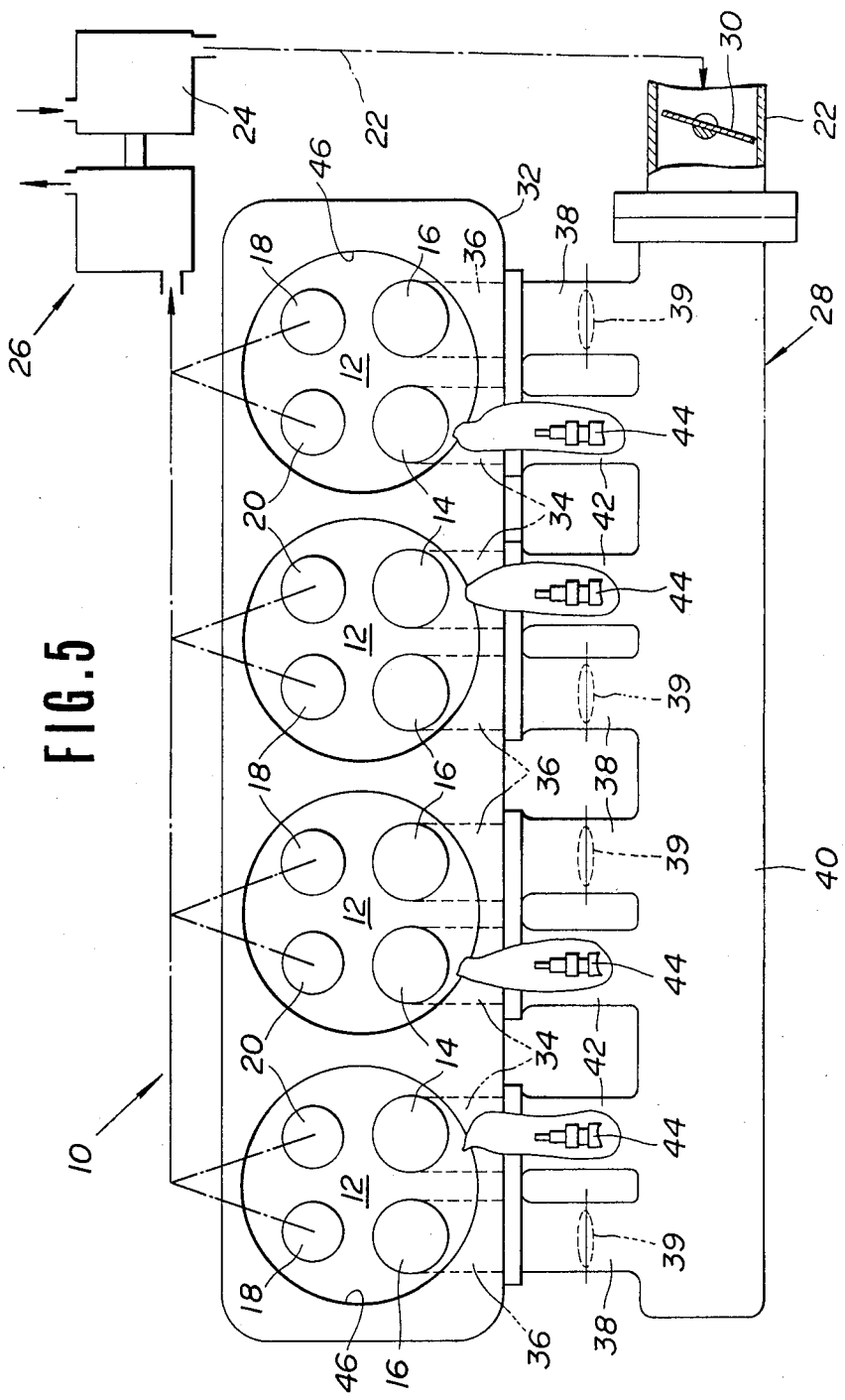
FIG. 5 is a schematic plan view of the arrangement shown in FIG. 4.

FIGS. 4 and 5 show an embodiment of the present invention. In this instance, the present invention is shown applied to a fuel injected turbo-charged four cylinder in-line engine 10 wherein each combustion chamber is provided with two inlet valve 14, 16 and two exhaust valves 18, 20. An induction conduit 22 leads from the compressor 24 of a turbo-charger 26 to an induction manifold 28. A throttle valve 30 is disposed in the induction conduit 22 immediately upstream of the manifold 28.

The cylinder head 32 is formed with a plurality of what shall be referred to as "low-speed" induction ports 34 and a plurality of corresponding "high speed" ports 36. Branch runners 38 in which butterfly type flow control valves 39 are disposed, establish fluid communication between the main section 40 of the induction manifold and the high speed ports 36 while branch runners 42 in which fuel injectors 44 are disposed are arranged to establish fluid communication between said main section 40 and the low speed ports 34.

As will be appreciated, the low speed ports 34 may be arranged so as to introduce the incommining charge into the respective combustion chambers 12 in a manner to swirl about the axes of the cylinder bores 46, while the high speed ports 36 may be arranged to direct a flow of air into the chambers in manner which damps the swirl and thus obviates harsh combustion due to excessive swirl rates which are apt to occur at high engine speeds.

The inlet and exhaust valves 14, 16, 18, 20 of the illustrated arrangement are arranged to be opened and closed under the influence of a double overhead cam arrangement 48. The cams 50 which lift the exhaust valves 18, 20 have the same contour. However, the cams 52, 53 which control the movement of the inlet valves 14, 16 are arranged so that the high speed valves 16 start lifting at about 30° C. before TDC of the exhaust phase while the low speed valve (14) lift is not initiated until approximately TDC of same. Further, as will be clear from section (A) of FIG. 6, the degree by which each of the high and low speed inlet valves 16, 14 are lifted, is different.

The butterfly valves 39 are arranged to be opened and closed by an actuator or actuators 54. In the instant embodiment the actuator(s) 54 takes the form of a pneumatic servo motor which includes a spring biased piston 56 connected to the butterfly valves via a suitable linkage arrangement 57. The pressure chamber 58 of the servo is selectively supplied air under pressure via a solenoid powered three-way valve 60. As shown, this valve is arranged to supply atmospheric pressure to the pressure chamber 58 when in a first state (de-energized) and air under pressure from a reservoir 62 when in a second state (energized). The reservoir 62 is supplied air under pressure from a compressor or like source 63 (not shown) via a one-way valve 64.

A control circuit 66 is supplied data from a pressure sensor 68 disposed in the induction manifold 28 downstream of the engine throttle valve 30 and upstream of the butterfly valves 39 and arranged to sense the level of supercharging pressure prevailing in the induction manifold. The control circuit 66 further receives data from a engine rotational speed sensor 70.

With the above described arrangement when the engine is operating under light load (e.g. such as when the engine is idling), the control circuit 66 conditions the valve 60 so as to establish fluid communication between the pressurized air reservoir 62 and the pressure chamber 58 of the servo 54. This causes the piston 56 to move against the bias of the spring disposed in the unit and drive the butterfly valves 39 to their closed positions. To ascertain the linkage 57 having assumed a position wherein the butterfly valves 39 are closed, a limit switch 72 is disposed as shown and arranged to output a feedback signal to the control circuit 66.

The control circuit 66 is arranged to respond to the output of the engine rotational speed sensor 70 in a manner to de-energize the solenoid valve 60 and thus condition same to supply atmospheric pressure to the pressure chamber 58 of the servo 54 upon a predetermined RPM being reached or upon the rate at which the engine speed is increasing exceeding a predetermined rate. The control circuit 66 is further responsive to the supercharging pressure prevailing in the induction system downstream of the engine throttle valve 30 so that upon the pressure exceeding a predetermined level indicative of the engine mode having changed from low speed to high speed, the solenoid valve 60 is de-energized to allow the butterfly valves 39 to move to their respective open positions and allow for induction to the effected through both sets of induction passages and ports 39, 42, 36, 34.

An air bleed port 80 is formed in each of the branch runners 38 which communicate with the high speed induction ports 36, downstream of the butterfly valves. By-pass conduits 82 lead from upstream of the engine throttle valve 30 to each of the bleed ports 80.

A calibrated orifice 84 is disposed in the downstream end of each by-pass conduit (alternatively this element may be disposed in the air-bleed per se). The size of the orifices 84 is selected so that when the engine is idling, for example at 600 RPM, sufficient air is allowed to pass through the orifice to establish essentially atmospheric pressure (viz., a pressure essentially equal to the exhaust pressure) in the high speed ports 36 viz., between the poppet valves 16 and the butterfly valves 39. Viz., a sufficient volume of air should pass through the orifices 84 in the order of 0.1 seconds so as to establish essentially atmospheric pressure in said sections prior to the initial lift of the high speed poppet valves 16.

It will be noted that a flow rate of the above mentioned order causes the flow actually passing through each orifice 84 per se to approach sonic velocity and thus endow self-cleaning properties on the arrangement. That is to say, prevent the formation of carbon or like soot deposits which tend to plug the orifices 84 to the point of limiting or preventing the desired amount of air from entering the induction system. In practice it has been found that an orifice of 1-2 mm provides suitable results. It has also been found that this cleaning effect also tends to prevent sticking of the shafts on which the butterfly valves 39 are pivoted.

In the event that too much air able to pass through the by-pass conduit control of the minimum amount of air inducted into the engine (via closure of the engine throttle valve) becomes difficult. In the event that such a problem is encountered it is within the scope of the present invention to provide an electronically controlled valve in the by-pass conduit.

Figure 6:
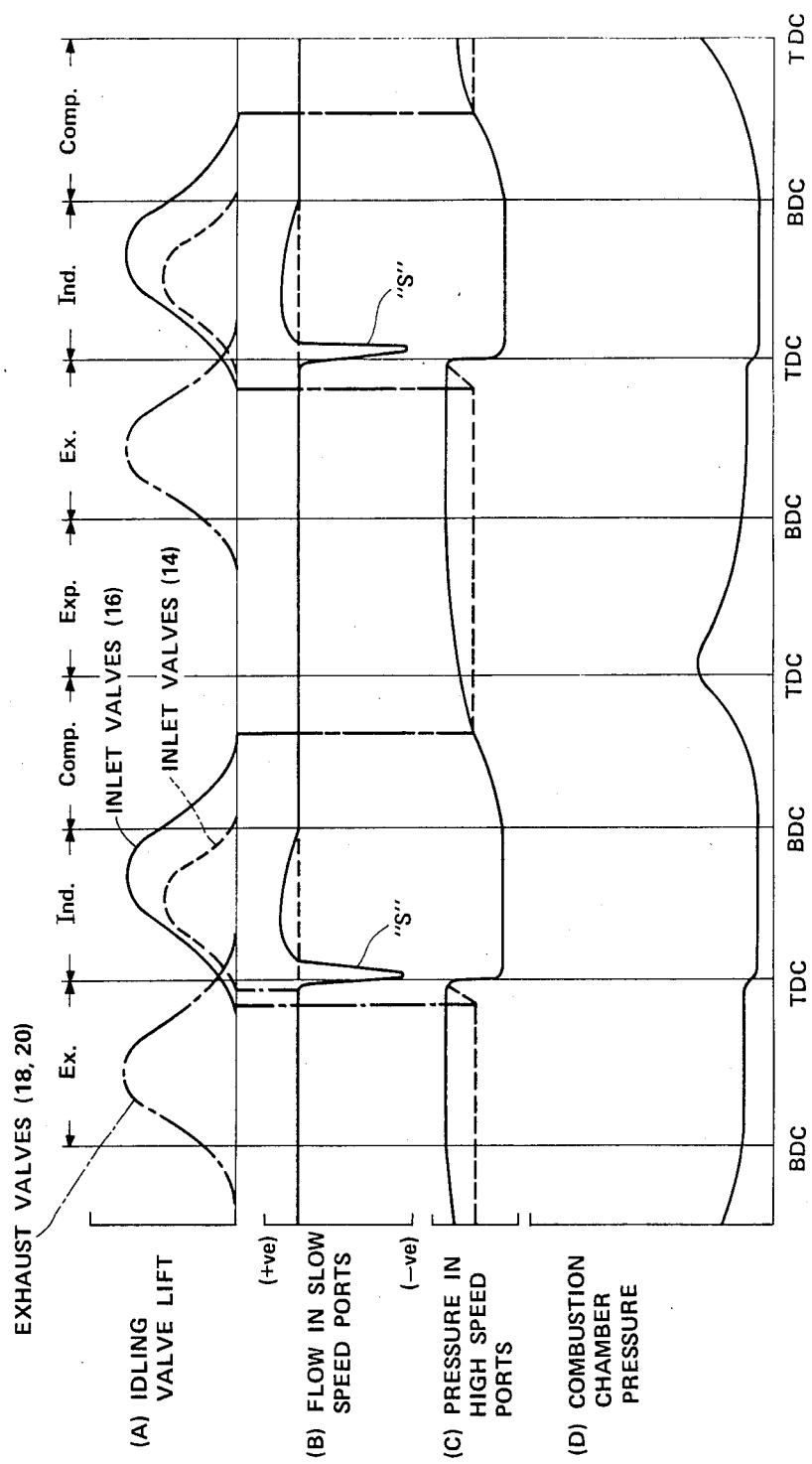
FIG. 6 is a timing chart showing the valve lift and pressure development characteristics achieved with the embodiment of the invention shown in FIGS. 4 and 5 during low speed/load operation.

Experiments have revealed that in the event that the by-pass conduits 82 are not provided and the orifices 84 permitted to communication directly with the atmosphere, the pressure build up in the high speed ports 36 tends to follow the characteristics shown in chain line in section (C) of FIG. 6 whereby the tendancy of exhaust gases from the combustion chamber 12 to back flow into the high speed ports 36 as the poppet valves 16 lift is not prevented to an adequate degree and the desired improvement of combustion characteristics under such conditions not achieved.

FIG. 6 shows graphically the operation which occurs with the present invention. Section (A) of this timing chart shows the valve lift characteristics during idling; section (B) the flow characteristics of the slow speed ports; section (C) the pressure which prevails in the high speed ports downstream of the flow control valves with the latter closed; and section (D) the combustion chamber pressure history.

Figure 7:
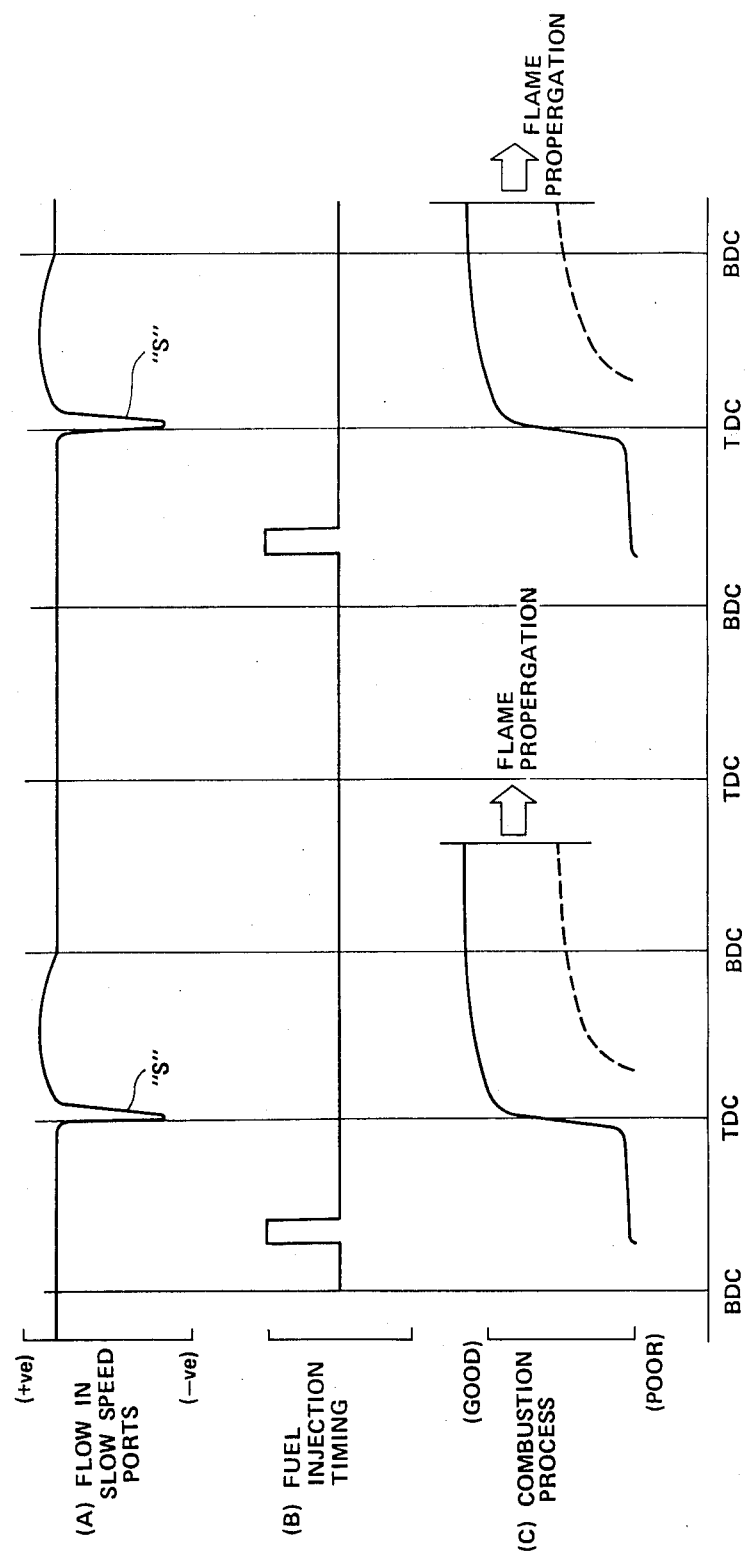
FIG. 7 is another timing chart showing the induction, injection timing and combustion characteristics provided by the embodiment of the present invention under the above mentioned low speed/load conditions.
Figure 8:
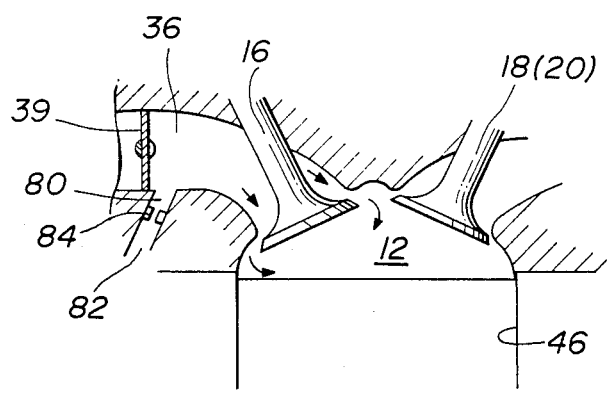
FIGS. 8 and 9 are schematic elevational and plan views respectively, showing the air flow characteristics which occur during idling due to the provision of the present invention.
Figure 9:
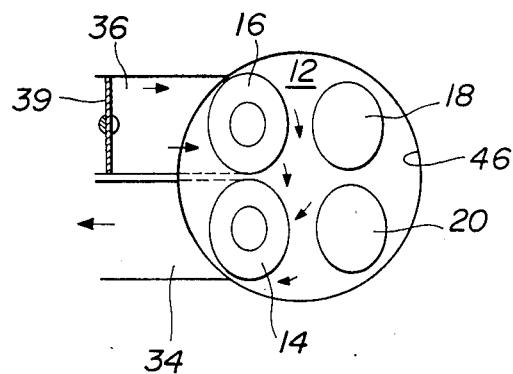

As will be appreciated when the high speed valves 16 open, the pressure prevailing in the induction ports 36 immediately upstream thereof is essentially equal to the pressure prevailing in the exhaust ports and a back flow of exhaust gas thereinto does not occur. However, when the low speed induction valves 14 open, as the engine throttle valve 30 is closed a vacuum of approximately 500 mmHg exists in the induction manifold 28. Accordingly, a sudden back flow of fluid tends to initially occur (see "S" in section B). However, as shown in FIGS. 8 and 9, due to the introduction of fresh air into the high speed ports 36, upon opening of the low speed valves 14 the fresh air introduced into the high speed ports 36 tends to flow in place of exhaust gases into the slow speed ports 34. Accordingly, by setting the fuel injection timing as shown in section (B) of FIG. 7, during idling (low speed/load), the fuel injected toward the low speed ports 34 initially strikes the relatively high speed fluid flowing (back flowing) out of the combustion chamber and thereafter is sucked back into the combustion chamber as the piston decends from TDC. This causes the fuel to become highly atomized which in combination with the reduced amount of residual gas which tend to remain in the combustion chambers results in a remarkable improvement in combustion characteristics as shown in section (C) of FIG. 7.

What is claimed is:
1. In an internal combustion engine
   a combustion chamber;
   first and second inlet valves, said first inlet valve being arranged to open at a first predetermined timing prior the end of the exhaust phase of the engine, said second inlet valve being arranged to open essentially at the end of said exhaust phase;
   a first induction conduit leading from a source of air to said first inlet valve;
   a second induction conduit leading from said source of air to said second inlet valve;
   an engine throttle valve operatively interposed between said source of air and said first and second induction conduits;
   a flow control valve disposed in said first induction conduit for cutting off communication between said source of air and said first inlet valve when said engine is operating in a first mode and for permitting said communication when said engine is operating under a second mode; and
   an air bleed formed only in said first induction conduit at a location downstream of and proximate said flow control valve for permitting a controlled amount of air to enter said first inlet conduit.

2. An internal combustion engine as claimed in claim 1, wherein said source of air takes the form of a supercharger and which further comprises a by-pass conduit which leads from upstream of said throttle valve to said air bleed.

3. An internal combustion engine as claimed in claim 1, wherein said air bleed takes the form of a calibrated orifice which is so selected that air flows therethrough at essentially sonic velocity and in an amount which maintains a predetermined pressure in said first conduit downstream of said flow control valve when the engine speed is at a preselected value.

4. An internal combustion engine as claimed in claim 1, further comprising:
   an actuator for operating said flow control valve; and
   a control unit for controlling said actuator, said control unit being responsive to the rotational speed of said engine and to the pressure prevailing in said first induction conduit at a location upstream of said flow control valve.

5. An internal combustion engine as claimed in claim 1, further comprising:
   a first exhaust valve, said first exhaust valve being arranged to open with a predetermined overlap with said first inlet valve at the end of the exhaust phase and during the initial portion of the subsequent induction phase.

6. An internal combustion engine as claimed in claim 1, further comprising a fuel injector disposed in said second induction conduit said fuel injector being arranged to inject fuel into said second conduit at a timing immediately prior the opening of said second inlet valve when said engine is operating in said first mode.

7. A method of operating an internal combustion engine comprising the steps of:
   (a) introducing air from a source of air into a combustion chamber through both of first and second induction ports during a first mode of engine operation;
   (b) opening a first valve which controls fluid communication between said source and said combustion chamber via said first induction port at a predetermined timing prior the end of the exhaust phase of said engine;
   (c) opening a second valve which controls fluid communication between said sources and said combustion via said second induction port at essentially the end of said exhaust phase;

(d) cutting off communication between said source of air and said first inlet valve during a second mode of engine operation using a flow control valve associated with said first induction port; and (e) reducing the amount of exhaust gas which tends to remain in said combustion chamber during said second mode by obviating the formation of a negative pressure in said first induction port immediately upstream of said first inlet valve via introducing a limited amount of air into said first induction port at a location downstream of and proximate said flow control valve.

8. A method as claimed in claim 7 further comprising the steps of:

(f) injecting fuel into said second induction port immediately prior the opening of said second inlet valve when said engine is operating in said second mode;

(g) allowing some of the air introduced in step (e) to back flow into said second induction port immediately after the lift of said second valve;

(h) mixing the fuel injected in step (f) with the air permitted to backflow into said second induction port; and (i) re-inducting the air-fuel mixture which results in step (h) into said combustion chamber.

* * * * *